United States Patent
Wu et al.

(10) Patent No.: US 8,229,981 B2
(45) Date of Patent: Jul. 24, 2012

(54) MULTIMEDIA PLAYER AND METHOD OF OPERATING THE SAME

(75) Inventors: Wen-Jong Wu, Taipei (TW); Rung-Huei Liang, Taipei (TW); Chih-Ying Yang, Taipei (TW); Yang-Bee Lee, Taipei (TW); Yi-Chu Lin, Taipei (TW); Ming-Hong Yeh, Taipei (TW); Chung-Ping Lai, Taipei (TW); Cheng-Dar Chiang, Taipei (TW); Shiang-Wen Cheng, Taipei (TW)

(73) Assignee: National Taiwan University, Taipei (TW)

( * ) Notice: Subject to any disclaimer, the term of this patent is extended or adjusted under 35 U.S.C. 154(b) by 20 days.

(21) Appl. No.: 13/030,405

(22) Filed: Feb. 18, 2011

(65) Prior Publication Data

US 2012/0110041 A1    May 3, 2012

(30) Foreign Application Priority Data

Oct. 29, 2010    (TW) ................................ 99137255 A

(51) Int. Cl.
*G06F 17/30* (2006.01)

(52) U.S. Cl. ........................................ 707/821; 707/913
(58) Field of Classification Search .................. 707/821, 707/913, 999.102
See application file for complete search history.

(56) References Cited

U.S. PATENT DOCUMENTS

| | | | | |
|---|---|---|---|---|
| 7,496,193 B2* | 2/2009 | Nachef et al. | ............ | 379/357.01 |
| 2004/0128514 A1* | 7/2004 | Rhoads | ........................ | 713/176 |
| 2004/0133518 A1* | 7/2004 | Dryall | ............................ | 705/50 |
| 2010/0332691 A1* | 12/2010 | Yoshida | ......................... | 710/16 |
| 2011/0135110 A1* | 6/2011 | Chen | ............................. | 381/86 |

* cited by examiner

*Primary Examiner* — Cheryl Lewis
(74) *Attorney, Agent, or Firm* — Occhiuti Rohlicek & Tsao LLP

(57) ABSTRACT

A multimedia player includes an execution button for generating an execute instruction when operated, an auxiliary card associated with a file managing instruction, an auxiliary card reader for electrically connecting with the auxiliary card, and a control unit electrically connected to the execution button and the auxiliary card reader. The control unit is operable, in response to the execute instruction from the execution button, to execute the file managing instruction associated with the auxiliary card that is electrically connected to the auxiliary card reader.

14 Claims, 5 Drawing Sheets

MULTIMEDIA PLAYER AND METHOD OF OPERATING THE SAME

CROSS-REFERENCE TO RELATED APPLICATION

This application claims priority of Taiwanese Application No. 099137255, filed on Oct. 29, 2010.

BACKGROUND OF THE INVENTION

1. Field of the Invention

The present invention relates to a multimedia player and a method of operating the multimedia player, more particularly to a multimedia player and a method of operating the multimedia player for managing multimedia files.

2. Description of the Related Art

Since a conventional multimedia player is usually provided with a relatively bigger screen, an amount of buttons thereof is limited. Therefore, it may be inconvenient to operate the conventional multimedia player. However, if the conventional multimedia player is provided with a relatively greater amount of buttons, operation of the conventional multimedia player will be relatively complicated.

SUMMARY OF THE INVENTION

Therefore, an object of the present invention is to provide a multimedia player that is easy and convenient to operate.

Accordingly, a multimedia player of the present invention comprises an execution button for generating an execute instruction when operated, an auxiliary card associated with a file managing instruction, an auxiliary card reader for electrically connecting with the auxiliary card, and a control unit electrically connected to the execution button and the auxiliary card reader. The control unit is operable, in response to the execute instruction from the execution button, to execute the file managing instruction associated with the auxiliary card that is electrically connected to the auxiliary card reader.

Another object of the present invention is to provide a method of operating a multimedia player.

According to another aspect, a method is for operating a multimedia player of the present invention. The multimedia player includes an execution button for generating an execute instruction when operated, an auxiliary card associated with a file managing instruction, an auxiliary card reader for electrically connecting with the auxiliary card, and a control unit electrically connected to the execution button and the auxiliary card reader The method comprises the step of, in response to the execute instruction from the execution button while the auxiliary card is electrically connected to the auxiliary card reader, configuring the control unit to execute the file managing instruction associated with the auxiliary card automatically.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
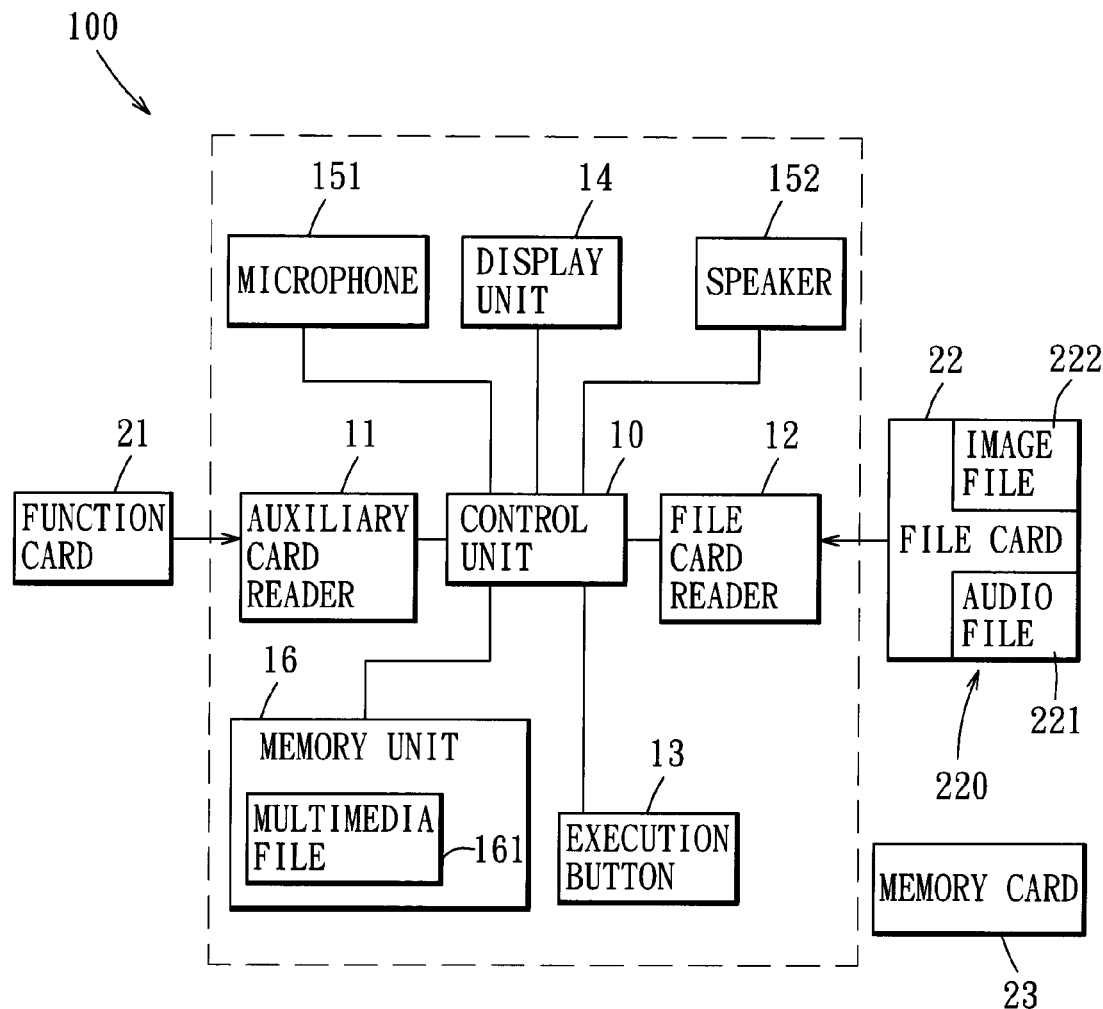
FIG. 1 is a block diagram illustrating a preferred embodiment of a multimedia player according to the present invention.
Figure 2:
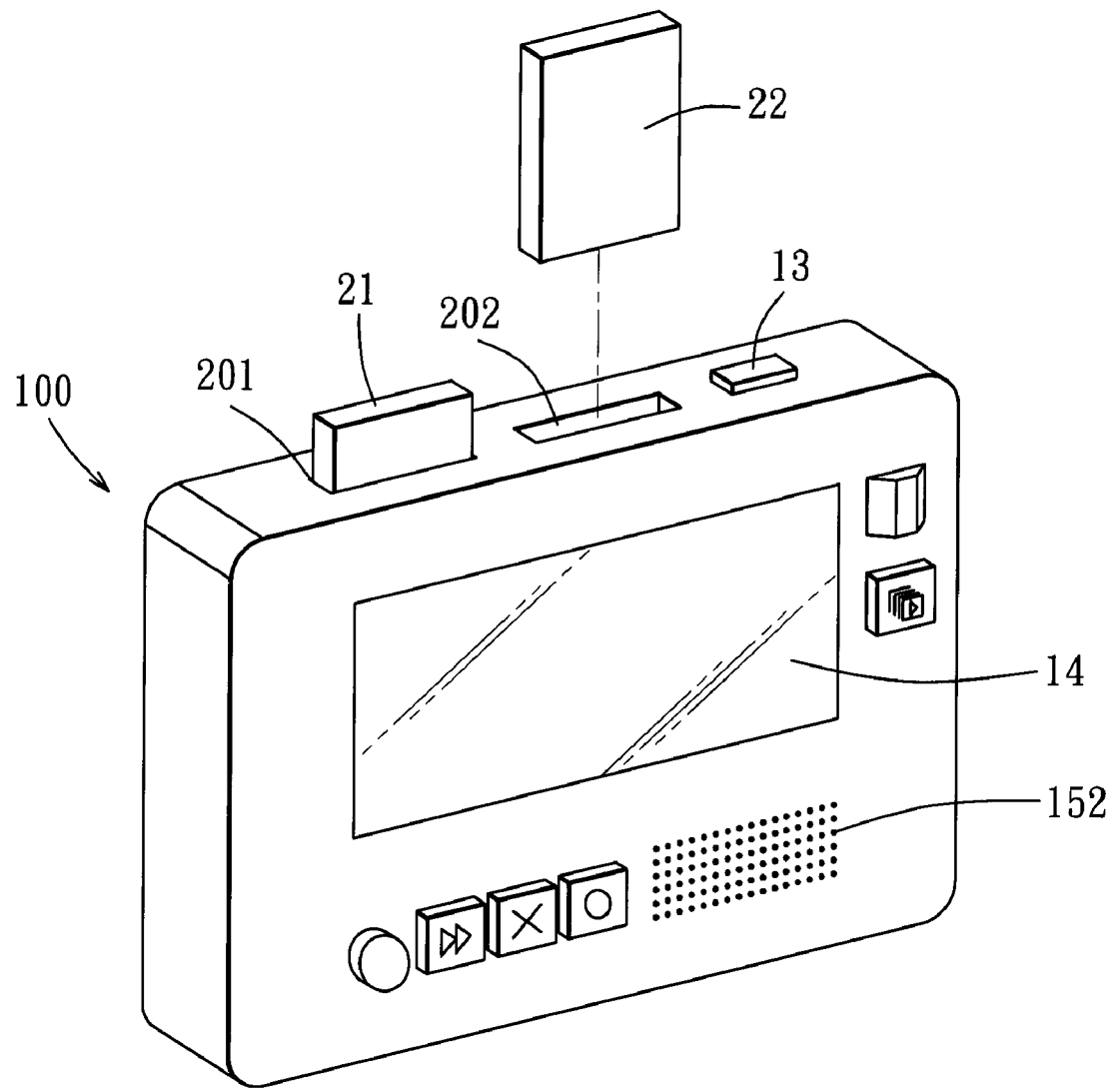
FIG. 2 is a perspective view of the multimedia player of the preferred embodiment.

Referring to FIGS. 1 and 2, a preferred embodiment of a multimedia player 100 of the present invention includes a control unit 10, an auxiliary card reader 11, a file card reader 12, an execution button 13, a display unit 14, a microphone 151, a speaker 152, a memory unit 16, and at least one auxiliary card. The auxiliary card reader 11, the file card reader 12, the execution button 13, the display unit 14, the microphone 151, the speaker 152 and the memory unit 16 are all electrically connected to the control unit 10.

The file card reader 12 is configured for electrically connecting with a file card 22 that stores a plurality of multimedia files 220 including audio files 221 and image files 222. The memory unit 16 also stores a plurality of multimedia files 161. In this embodiment, each of the image files 222 corresponds to one or more of the audio files 221. Alternatively, the image files 222 have no connection with the audio files 221 in other embodiments. The display unit 14 is configured for displaying the image files 222 stored in the file card 22 that is electrically connected to the control unit 10 through the file card reader 12. The microphone 151 is configured for receiving a sound wave and converting the sound wave into an electrical signal, and the control unit 10 is operable to record the sound wave as an audio file according to the electrical signal from the microphone 151 and to store the audio file in the file card 22 or in the memory unit 16. The speaker 152 is configured for generating an audio output associated with the audio files 221 stored in the file card 22.

The execution button 13 is operable to generate an execute instruction when operated. The auxiliary card is associated with a file managing instruction, and may be a function card 21 storing the file managing instruction therein or a memory card 23 storing source files therein. In practice, the multimedia player 100 may include a plurality of function cards 21 each of which stores a respective file managing instruction therein. The auxiliary card reader 11 is configured for electrically connecting with the auxiliary card so as to provide the control unit 10 with the file managing instruction associated with the auxiliary card that is electrically connected to the auxiliary card reader 11.

In response to the execute instruction from the execution button 13, the control unit 10 is operable to automatically execute the respective file managing instruction associated with the auxiliary card that is electrically connected to the auxiliary card reader 11. Thus, the multimedia player 100 is capable of implementing various functions with the single execution button 13 so that the multimedia player 100 is not provided with various buttons so as to avoid complicated operation.

Referring to FIG. 2, the multimedia player 100 is formed with a first slot 201 and a second slot 202. When the function card 21 is inserted into the first slot 201 and is electrically connected to the auxiliary card reader 11, the control unit 10 is operable to control the display unit 14 to display information of the file managing instruction stored in the function card 21. When the file card 22 is inserted into second slot 202 and is electrically connected to the file card reader 12, the control unit 10 is operable to control the display unit 14 to display a message "Implementing the function, Don't remove the function card" while the execution button 13 is operated to generate the execute instruction to cause the control unit 10 to execute the file managing instruction. After finishing the file managing instruction, the control unit 10 is operable to control the display unit 14 to display the information of the file managing instruction again.

Referring to FIGS. 1 to 5, a method of operating the multimedia player 100 of this embodiment includes the following steps.

Figure 3:
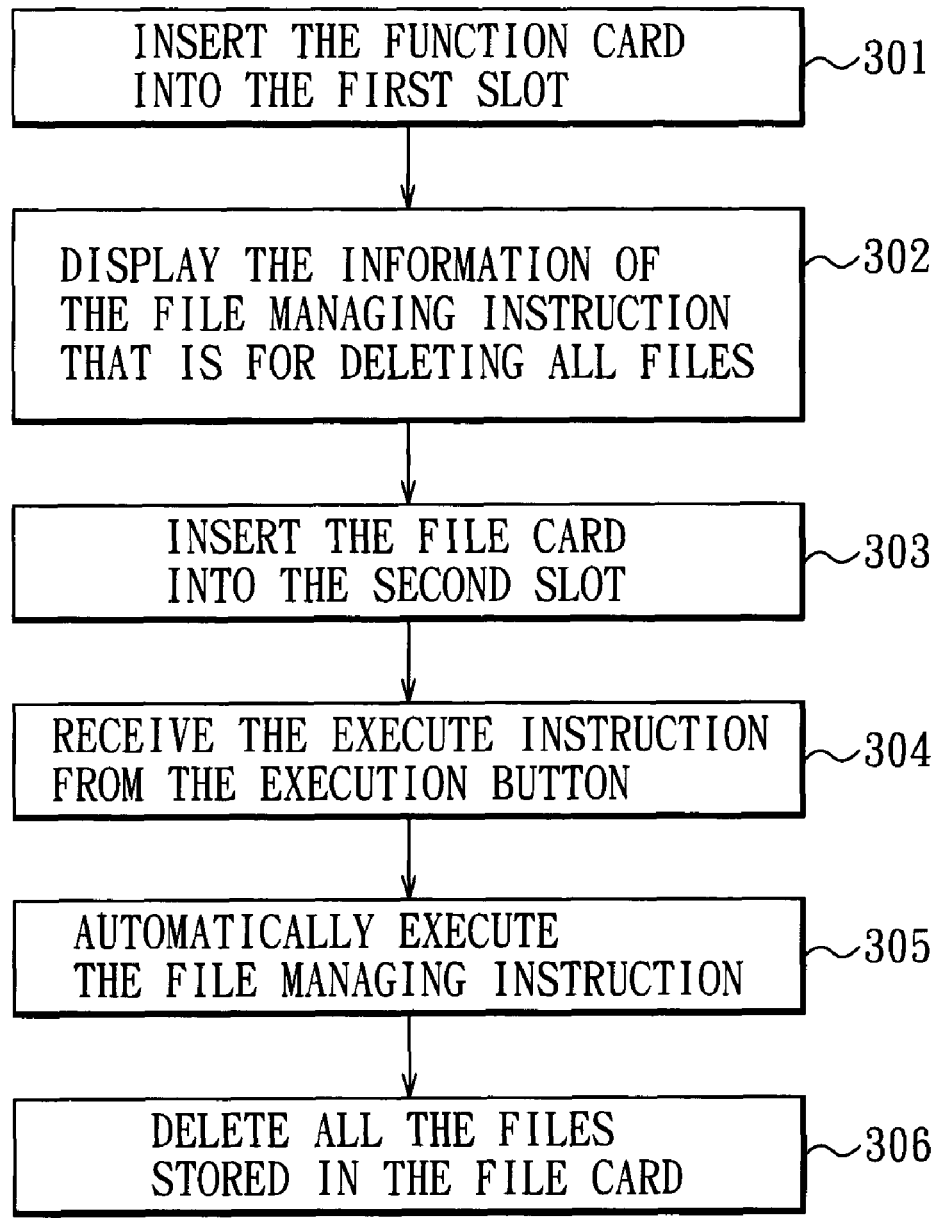
FIG. 3 is a flow chart illustrating a procedure of a method for operating the multimedia player to delete files.

In FIG. 3, when it is intended to delete all the files stored in the file card 22 that is electrically connected to the file card reader 12, the function card 21 that stores the file managing instruction for deleting all files is inserted into the first slot 201 and is electrically connected to the auxiliary card reader 11 in step 301. Then, in step 302, the control unit 10 is operable to control the display unit 14 to display the information of the file managing instruction to indicate that the function card 21 is used for deleting all files. When the file card 22 is inserted into the second slot 202 and is electrically connected to the file card reader 12 in step 303, and the control unit 10 receives the execute instruction from the execution button 13 in step 304, the control unit 10 is automatically operable to execute the file managing instruction stored in the function card 21 in step 305. In step 306, as a result of executing the file managing instruction, the control unit 10 is operable to delete all the files stored in the file card 22. That is to say, the multimedia files 220 (the audio files 221 and the image files 222) and other data stored in the file card 22 are deleted in step 306. Accordingly, in this example, the execution button 13 is operated to cooperate with the function card 21 for deleting all the files stored in the file card 22.

Figure 4:
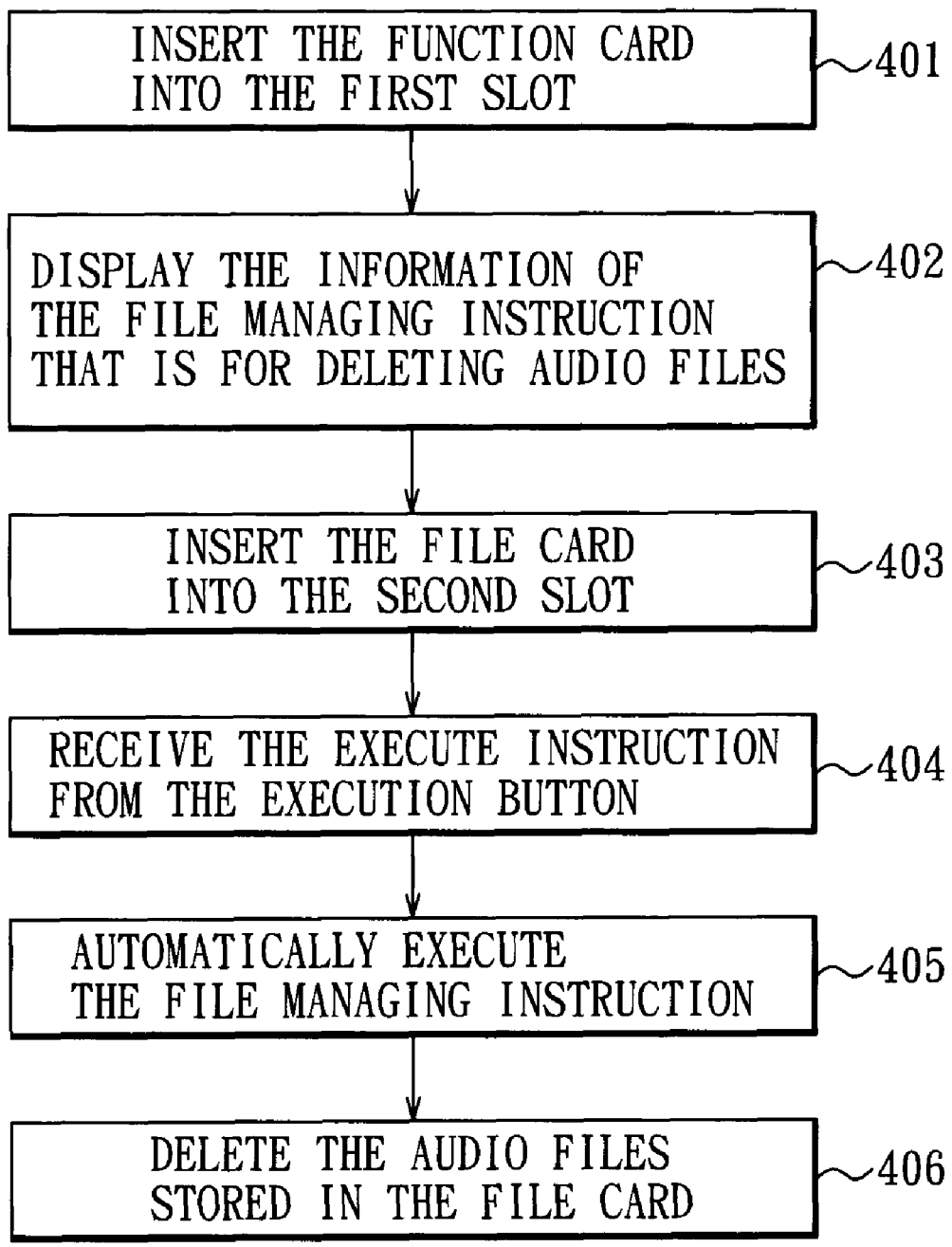
FIG. 4 is a flow chart illustrating a procedure of the method for operating the multimedia player to delete files that conform to a specified file format.

In FIG. 4, when it is intended to delete the files that are stored in the file card 22 and that conform to a specified file format (for example, the audio files 221), the function card 21 that stores the file managing instruction for deleting audio files is inserted into the first slot 201 and is electrically connected to the auxiliary card reader 11 in step 401. Then, in step 402, the control unit 10 is operable to control the display unit 14 to display the information of the file managing instruction to indicate that the function card 21 is used for deleting audio files. When the file card is inserted into the second slot 202 and is electrically connected to the file card reader 12 in step 403, and the control unit 10 receives the execute instruction from the execution button 13 in step 404, the control unit 10 is automatically operable to execute the file managing instruction stored in the function card 21 in step 405. In step 406, as a result of executing the file managing instruction, the control unit 10 is operable to delete the audio files 21 stored in the file card 22. Accordingly, in this example, the execution button 13 is operated to cooperate with the function card 21 for deleting all the audio files 221 stored in the file card 22.

Figure 5:
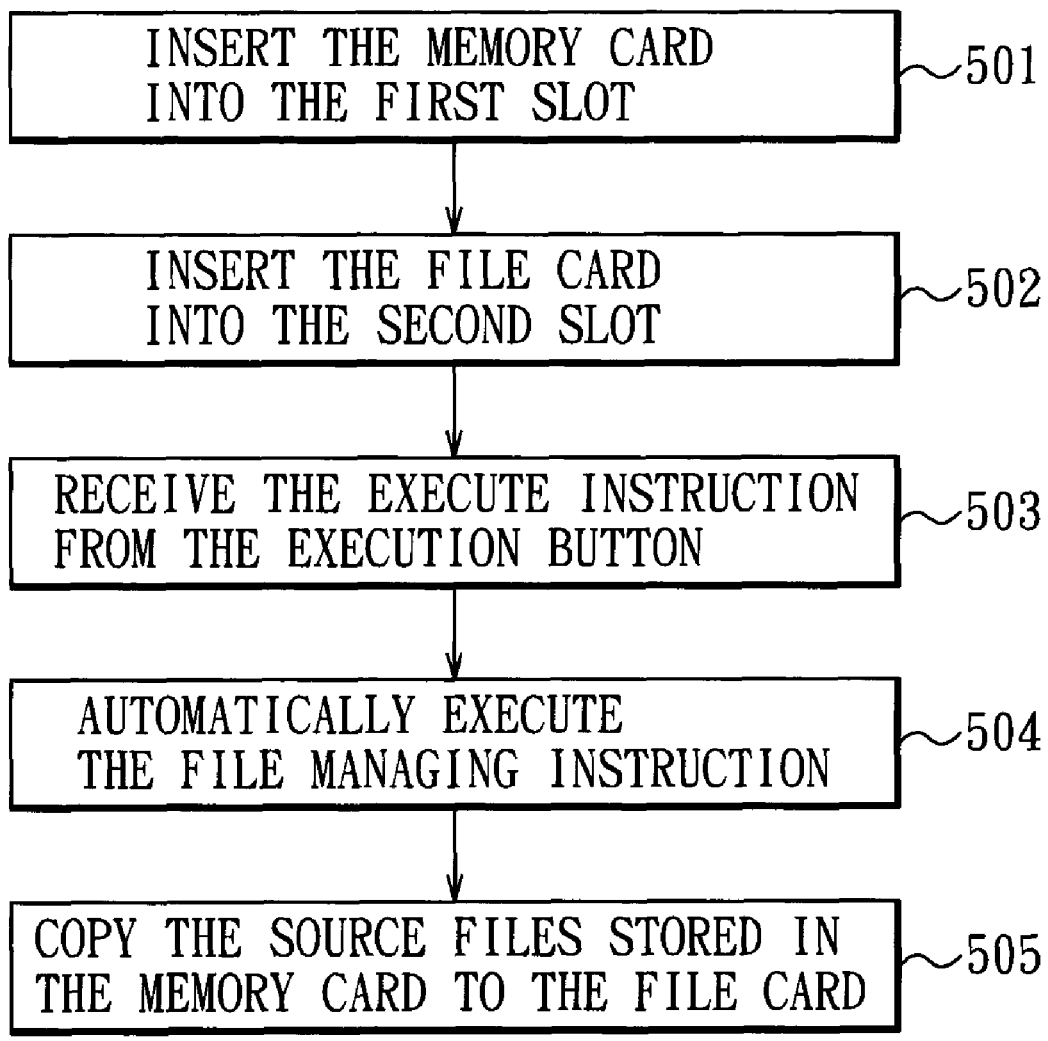
FIG. 5 is a flow chart illustrating a procedure of the method for operating the multimedia player to copy source files stored in a memory card to a file card.

In FIG. 5, when it is intended to copy the source files stored in the memory card 23 to the file card 22, the memory card 23 is inserted into the first slot 201 and is electrically connected to the auxiliary card reader 11 in step 501. Then, the file card 22 is inserted into the second slot 202 and is electrically connected to the file card reader 12 in step 502. When the control unit 10 receives the execute instruction from the execution button 13 in step 503, the control unit 10 is automatically operable to execute the file managing instruction associated with the memory card 23 in step 504. In practice, the memory card 23 may have the file managing instruction for copying the source files stored therein, or may have an index corresponding to the file managing instruction that is stored in the memory unit 16 of the multimedia player 100. In step 505, as a result of executing the file managing instruction, the control unit 10 is operable to copy the source files stored in the memory card 23 to the file card 22. Accordingly, in this example, the execution button 13 is operated to copy the source files stored in the memory card 23 to the file card 22.

In summary, the virtue of the multimedia player 100 is that the execution button 13 is operated to cooperate with various function cards 21 and the memory card 23 such that the multimedia player 100 is capable of implementing various functions with the single execution button 13 instead of various function buttons. Further, operation of the multimedia player 100 is relatively convenient and simple.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A multimedia player comprising:
   an execution button for generating an execute instruction when operated;
   an auxiliary card associated with a file managing instruction;
   an auxiliary card reader for electrically connecting with said auxiliary card; and
   a control unit electrically connected to said execution button and said auxiliary card reader;
   wherein said control unit is operable, in response to the execute instruction from said execution button, to execute the file managing instruction associated with said auxiliary card that is electrically connected to said auxiliary card reader.

2. The multimedia player as claimed in claim 1, further comprising a file card reader for electrically connecting with a file card, said file card reader being electrically connected to said control unit.

3. The multimedia player as claimed in claim 2, wherein the file managing instruction is for managing a file stored in the file card.

4. The multimedia player as claimed in claim 3, wherein the file managing instruction is for deleting the file stored in the file card.

5. The multimedia player as claimed in claim 3, wherein the file managing instruction is for deleting the file that is stored in the file card and that conforms to a specified file format.

6. The multimedia player as claimed in claim 1, wherein said auxiliary card is a memory card having the file managing instruction stored therein.

7. The multimedia player as claimed in claim 2, wherein said auxiliary card is a memory card that stores a source file therein, and the file managing instruction is for copying the source file to the file card.

8. A method of operating a multimedia player, the multimedia player including an execution button for generating an execute instruction when operated, an auxiliary card associated with a file managing instruction, an auxiliary card reader for electrically connecting with the auxiliary card, and a control unit electrically connected to the execution button and the auxiliary card reader, the method comprising:
   in response to the execute instruction from the execution button while the auxiliary card is electrically connected to the auxiliary card reader, configuring the control unit to execute the file managing instruction associated with the auxiliary card automatically.

9. The method as claimed in claim 8, the multimedia player further including a display unit, said method further comprising:

configuring the control unit to control the display unit for displaying information of the file managing instruction when the auxiliary card is electrically connected to the auxiliary card reader.

10. The method as claimed in claim 8, the multimedia player further including a file card reader for electrically connecting with a file card, the file card reader being electrically connected to the control unit, wherein the file managing instruction is for managing a file stored in the file card.

11. The method as claimed in claim 10, wherein the file managing instruction is for deleting the file stored in the file card.

12. The method as claimed in claim 10, wherein the file managing instruction is for deleting the file that is stored in the file card and that conforms to a specified file format.

13. The method as claimed in claim 8, wherein the auxiliary card is a memory card having the file managing instruction stored therein.

14. The method as claimed in claim 8, the multimedia player further including a file card reader for electrically connecting with a file card, the file card reader being electrically connected to the control unit, wherein the auxiliary card is a memory card that stores a source file therein, and the file managing instruction is for copying the source file to the file card.

* * * * *